2,940,875
SILICONE-COATED FIBROUS PRODUCTS AND PROCESS THEREFOR

Frederick A. Smith, Kenmore, and Thomas H. Welch, Eggertsville, N.Y., assignors to Union Carbide Corporation, a corporation of New York No Drawing. Filed June 19, 1956, Ser. No. 592,265

7 Claims. (Cl. 117—161)

This invention relates to improved silicone-coated fibrous products. More particularly, this invention relates to fibrous products that have been rendered abhesive by the formation of a silicone coating thereon which coating has been improved to the extent that adhesive materials in prolonged contact therewith retain their adhesive properties and to a process for the production thereof.

The coined term "abhesive," as employed above, is suggestive of an antonym of the term "adhesive." It is pointed out, however, that the term "abhesive," as employed herein, has a meaning more specific than that of a simple antonym of "adhesive" and more specific than that of the term "non-adhesive." "Abhesive" defines or indicates a quality or property by virtue of which adhesion or adherence of sticky, tacky or finely divided materials to abhesive products through contact is inhibited or prevented. The term "abhesive" is employed in order to provide for accuracy of disclosure and understanding of the invention and for identification of the products of the invention. Similar objectives may be achieved through the use, in connection with the use of "abhesive," of all adjective, verb, adverb and noun forms relating to "adhesive," modified only by the substitution of the letter "b" for the letter "d."

It is disclosed in the copending United States patent application Ser. No. 460,504, October 26, 1954, now abandoned, that fibrous materials can be treated with a siloxane oil or gum so as to produce thereon a coating of a silicone elastomer. The coated fibrous products so produced exhibit abhesive properties. By virtue of their abhesive properties these products have found numerous applications. By way of illustration, they can be used as components of fibrous containers, conveyor belts and coverings which come into contact with such sticky and tacky materials as bread dough, rubber, candy, plastics, the adhesive undersurface of linoleum and the like during the manufacture, transportation and storage of these materials. Abhesive silicone-coated fibrous products can also be used as components of slide conveyors. In the latter case such finely divided materials as flour, Portland cement and the like will not tend to block or clog the pores of the coated fibrous product; due to this property of the conveyors air or other gases are permitted to pass between the fibers thereof so as to maintain the finely divided materials in a fluidized state while they move along the conveyor.

The abhesive silicone-coated fibrous products disclosed in the above-mentioned application, although generally useful, were not found entirely satisfactory in those limited applications wherein they were in contact with adhesive materials for prolonged periods. By way of illustration, adhesive undersurfaces of linoleum that are covered temporarily with an abhesive silicone-coated fibrous material in order to protect the undersurface and to facilitate handling of the linoleum tend to lose some of their desirable adhesiveness if the fibrous covering material is not removed in a fairly short time.

We have found that the loss in adhesiveness of adhesive materials that are left in prolonged contact with the abhesive silicone-coated fibrous products disclosed in the above-mentioned application does not occur when the siloxane oil or gum that is used in forming the silicone coating on the fibrous material has been treated so as to remove the contaminating low molecular weight siloxanes generally present in the oil or gum before the siloxane oil or gum is used in forming the coating. Apparently, the low molecular weight siloxanes present in the siloxane oil or gum used to form the coating do not constitute a permanent part of the coating and the loss in adhesiveness is due to the migration of these low molecular weight siloxanes from the silicone coating on the fibrous material to the adhesive material.

The low molecular weight siloxanes that appear to cause the undesired loss in adhesiveness mentioned above are almost invariably present in the siloxane oils and gums such as are used to produce the silicone coating on fibrous materials disclosed in the above-mentioned application. The low molecular weight siloxanes are present because the siloxane gum or oil is usually produced by an equilibration reaction that comprises heating a mixture of low molecular weight siloxanes in the presence of a basic catalyst and, under such conditions, an equilibrium seems to exist between the low molecular weight siloxanes and the high molecular weight siloxanes that comprise the greater and useful part of the oil or gum. Hence the siloxane oil or gum as usually produced contains an equilibrium concentration of low molecular weight siloxanes as well as the basic catalyst in addition to the desired high molecular weight siloxanes. The removal of the contaminating low molecular weight siloxanes from siloxone oils or gums by volatilizing the low molecular weight siloxanes has not, according to our experience, been found satisfactory. Rather than obtaining a siloxane oil or gum that is free of low molecular weight siloxanes, the volatilization step causes a depolymerization reaction to occur, which when carried to completion by continued heating, results in the conversion of the siloxane oil or gum to low molecular weight siloxanes. Apparently, the residual basic catalyst that is present in the oil or gum and that had been added to catalyze the formation of the siloxane oil or gum also serves to catalyze the reverse reaction, that is, the depolymerization reaction.

The present invention is based on our discovery that the loss of adhesiveness in adhesive objects that are in contact with abhesive silicone coated products can be overcome by forming a silicone coating from a siloxane oil or gum that has been freed of low molecular weight siloxanes by the use of a small amount of finely divided silica. Our process for freeing a siloxane oil or gum from low molecular weight siloxanes includes the steps of forming a mixture of the siloxane oil or gum containing a basic catalyst and a small amount of finely divided silica and heating the mixture to a temperature sufficiently elevated to volatilize the low molecular weight siloxanes and to produce a siloxane oil or gum that is free of low molecular weight siloxanes.

The amount of contaminating low molecular weight siloxanes driven off by heat in our process corresponds approximately to the equilibrium concentration of these compounds in the siloxane oil or gum. Apparently the finely divided silica used in our process in some way reacts or combines with the basic catalyst that is usually present in the siloxane oil or gum that we use to produce silicone coatings on fibrous materials, thereby renders the basic catalyst inert and so prevents the basic catalyst from catalyzing the depolymerization of the high molecular weight siloxanes present in the siloxane oil or gum when the siloxane oil or gum is heated to remove the low molecular weight siloxanes. One mechanism for this process may be a chemical reaction of the basic catalyst with small amounts of Si—OH groups that may be present on the surface of the finely divided silica; another mechanism may be chemisorption of the basic catalyst on the surface of the finely divided silica.

The process by which a basic catalyst is rendered inert by finely divided silica is termed herein "deactivation" and a siloxane oil or gum containing a basic catalyst that has been rendered inert by finely divided silica is said herein to have been "stabilized." As used herein "devolatilized" denotes a siloxane oil or gum which has been freed of low molecular weight siloxanes.

The siloxane oil and gums used as starting materials in forming our improved abhesive silicone-coated fibrous products are the same as the oils and gums used in forming the abhesive silicone-coated products of the above-mentioned application. These siloxanes are predominantly high molecular weight dimethylsiloxanes that have from about 1.9 to about 2.2 methyl groups per silicon atom and that are contaminated by up to about 10% by weight of low molecular weight siloxanes such as hexamethyldisiloxane, hexamethylcyclotrisiloxane and the like. The siloxane oils and gums range in molecular weight from that corresponding to a viscosity of about 200,000 centipoises at room temperature (i.e. the oils) to that corresponding to a miniature penetrometer hardness of about 30 at room temperature (i.e. the gums). These siloxane oils and gums are curable, i.e. they can be converted to a silicone elastomer when heated with a peroxide catalyst.

The siloxane oils and gums used in the instant invention may be produced by known processes such as an equilibration process that comprises heating a mixture of low molecular weight cyclic dimethylsiloxanes (e.g. hexamethylcyclotrisiloxane, octamethylcyclotetrasiloxane and the like) in the presence of a basic catalyst (e.g. potassium dimethylsilanolate, potassium hydroxide and the like) to a temperature of about 150° C. for about 3 hours to cause the cyclic siloxanes to react to produce a siloxane oil or gum that comprises mostly high molecular weight siloxanes and up to about 10% low molecular weight siloxanes. The amount of the basic catalyst used in producing siloxane oils and gums is usually from about 10 parts to about 100 parts by weight of the basic catalyst per million parts by weight of the starting siloxanes.

The siloxane oils and gums used in forming our improved adhesive silicone-coated fibrous products are stabilized and devolatilized prior to forming the coating on the fibrous material according to the following process. A siloxane oil or gum can be mixed with from about 0.5 part to about 5.0 parts by weight of the finely divided silica per 100 parts by weight of the siloxane oil or gum. However, we prefer to use from about 1 part to about 3 parts by weight of finely divided silica per 100 parts by weight of the siloxane oil or gum. Amounts of the finely divided silica of more than about 5.0 parts by weight per 100 parts by weight of the siloxane oil or gum are generally undesirable since they tend to produce a nonuniform or heterogeneous coating on the fibrous materials in later operations. Amounts of finely divided silica of less than about 0.5 part by weight per 100 parts by weight of the siloxane oil or gum are generally undesirable since an excessive time may be required for the basic catalyst to be deactivated and since there may not be present a sufficient amount of finely divided silica to deactivate the basic catalyst.

The mixture of the siloxane and finely divided silica may be formed in a stirred vessel in those cases where the siloxane is an oil, or on a roll mill or in a Banbury mixer in those cases where the siloxane is a gum.

After adequate mixing of the siloxane oil or gum and the finely divided silica is accomplished, the finely divided silica deactivates the basic catalyst without the application of heat to produce a stabilized siloxane oil or gum. Elevated temperatures may be used to accelerate the deactivation process but they are not necessary.

The finely divided silica found to be useful in the instant invention may be produced by known processes. By one such process, a mixture is formed of silicon tetrachloride, hydrogen and oxygen and the mixture is heated to a temperature sufficiently elevated to cause the mixture to react to produce finely divided silica.

The finely divided silica used in our process comprises particles that have an average particle diameter of from about 10 millimicrons to about 30 millimicrons. One gram of these particles of finely divided silica has an average total surface area of from about 100 square meters to about 300 square meters. Appreciably larger sized particles of silica, such as may be used as reinforcing fillers in some silicone elastomers, must be used in larger amounts than were found useful in our process, in order to deactivate the basic compound present in the siloxane oil or gum. Such larger amounts of silica interfere seriously with operations wherein the silica-containing siloxane oil or gum is applied to the surface of a fibrous material.

The mixture of the stabilized siloxane oil or gum and finely divided silica is devolatilized by heating the mixture. Heating of the mixture may be conducted at from about 150° C. to about 250° C. for from about 1.0 hour to about 3.0 hours. Shorter or longer heating periods and higher or lower temperatures may be used to devolatilize the siloxane oil or gum but no commensurate advantage is gained thereby.

After the catalyst has been deactivated and the siloxane oil or gum has been devolatilized, the siloxane oil or gum can be processed to produce improved silicone-coated fibrous products according to a process which includes forming a mixture of the siloxane oil or gum, a liquid organic compound and, optionally, a curing agent, applying the mixture to the surface of the fibrous material to be coated, heating the fibrous material so treated to volatilize the solvent and to cure the siloxane oil or gum on the surface of the fibrous material and producing thereby an abhesive silicone-coated fibrous product. A description of this process is as follows.

A stabilized and devolatilized siloxane oil or gum is mixed with a liquid organic compound in which it is soluble or in which it can be dispersed either alone or with an emulsifying agent to form a stable emulsion or suspension. A curing agent may be added to this mixture. Suitable liquid organic compounds that may be mixed with the siloxane oil or gum in forming our coatings are aromatic compounds, such as toluene, mixtures of aromatic and aliphatic compounds, such as mineral spirits, halocarbon compounds such as carbon tetrachloride, and ethers, such as diethyl ether. When aliphatic compounds are used to form mixtures with the siloxane oil or gum, a liquid aromatic compound should be added in an amount equal to from 10 parts to 15 parts by weight per 100 parts by weight of the aromatic and aliphatic compounds.

The liquid organic compound and siloxane oil or gum mixture preferably contains from about 5 parts to about 15 parts by weight of the siloxane per 100 parts by weight of the liquid organic compound and siloxane oil or gum mixture. Mixtures containing from about 1 part to about 20 parts by weight of the siloxane per 100 parts by weight of the liquid organic compound and siloxane oil or gum mixture are useful, but operating within this range is not essential.

A curing agent may be added to the liquid organic compound and siloxane oil or gum mixture. Useful curing agents are peroxide compounds such as t-butyl perbenzoate and the like. Depending on the temperatures employed, the time allowed for curing and the source of the heat employed to effect the cure of the siloxane oil or gum to form a silicone coating in later operations, the curing agent may be present in an amount equal to from about 1.5 parts to about 15 parts by weight of the curing agent per 100 parts by weight of the siloxane oil or gum. It is preferred to add to the mixture from about 5 parts to about 10 parts by weight of the curing agent per 100 parts by weight of the siloxane oil or gum. These amounts of curing agent are not narrowly critical and so other amounts may be used but no commensurate advantage is gained thereby.

The siloxane oil or gum and liquid organic compound mixture may be applied to the fibrous material on which is to be formed our improved adhesive silicone coating by such operations as immersion, spraying or brushing followed by wringing, padding or air drying. These operations for applying the mixture to the fibrous material can be repeated more than once, if necessary, so as to form a layer of the mixture of the desired thickness on the fibrous material.

The siloxane oil or gum and liquid organic compound mixture used in our process can be readily applied to the fibrous material in the above-described ways because the mixture is homogeneous and of low viscosity. The small amount of finely divided silica present in the siloxane oil or gum forms a fairly stable suspension in the liquid phase or phases of the mixture.

After a layer of the liquid organic compound and siloxane oil or gum mixture has been established on the surface of the fibrous material, the material is heated to volatilize the solvent. Heating for about 10 minutes at about 70° C. usually suffices to evaporate the solvent. Alternately, air drying for a longer period can be used to remove the solvent. Curing of the siloxane on the surface of the fibers to form a silicone elastomer coating may be accomplished by the application of heat alone, or if a curing agent had been added to the liquid organic compound and siloxane oil or gum mixture, by the application of heat and the catalytic effect of the curing agent. The latter method of curing is preferred. When a curing agent is present, curing of the siloxane oil or gum to form a silicone elastomer coating on the fibers may be accomplished by heating the siloxane-coated fibers at about 100° C. for about one hour, or at about 150° C. for about 15 minutes, or about 170° C. for about 5 minutes. Shorter or longer cure times and higher or lower cure temperatures may be used with a curing agent but no commensurate advantage is gained thereby. The temperature required to effect the cure was found to be inversely proportional to the concentration of oxygen present in the vapor phase that is in contact with the fibers in the curing zone. When no curing agent is present, curing may be accomplished by heating the siloxane-coated fibers in air at about 371° C. for about 5 minutes, or at about 440° C. for about 2 minutes. Due to the higher temperatures employed, curing in the absence of a catalyst or of a large amount of oxygen is usually restricted to forming silicone coatings on such more or less refractory materials as glass fibers and the like.

The silicone coatings formed on the fibers of fibrous materials by our process may be present in an amount equal to from about 2 parts to about 10 parts by weight per 100 parts by weight of the coating and the fibers, but are preferably present in an amount equal to from about 2 parts to about 5 parts by weight per 100 parts by weight of the coating and the fibers. The increase in thickness of fibrous materials due to the presence of the coating was found not to exceed 1 mil and was usually found to be less than 0.5 mil.

The silicone coatings produced on fibrous materials by our process were not found to reduce significantly the porosity of the base fibrous material. Hence the passage of air or other gases through the pores in the fibrous material was virtually unaffected by the coating. Because of their elastomeric, rather than brittle properties such as are found among known siloxane coatings for fibrous materials, the silicone coatings on our products are useful in applications where they may be exposed to sudden and severe impacts. The fibers of our improved adhesive silicone-coated product serve as a filler for the silicone elastomer coating. The finely divided silica used to deactivate the basic catalyst is not usually present in sufficient amounts to function as a filler. We have found that the addition of reinforcing fillers, such as large amounts of carbon black, mica, coarse particles of silica and the like, to the siloxane oil or gum used to produce the silicone coating is not desirable both in view of the difficulty of applying such compositions uniformly to fibrous materials and also because the properties of the silicone coating are not appreciably improved thereby.

The following types of fibrous materials are suitable for use as base materials in producing our improved adhesive silicone-coated fibrous products:

Inorganic fabrics:
    Glass cloth
    Asbestos cloth
Organic fabrics:
    Cotton—
        (a) Oxford
        (b) Duck
        (c) Canvas
        (d) Poplin
        (e) Denim
        (f) Heavy belting
    Rayon
    Rayon-cotton blends
    Nylon
Papers:
    Kraft
    Parchment
    Glazed The nylon fibers suitable for use as base materials in our products are known materials, illustrative of which are the fibers produced from hexamethylenediamine and adipic acid. The rayon fibers suitable for use as base materials in our products are known materials, illustrative of which are the fibers produced from cellulose acetate.

The adhesive materials that have been exposed to prolonged contact with our improved adhesive silicone-coated fibrous products and that have not lost their adhesive properties are adhesive and transparent tapes that are composed of a cellulose or plastic backing and that have one tacky surface and the adhesive undersurface of linoleum. Illustrative of the adhesive and transparent tapes that retain their adhesiveness when placed in prolonged contact with our coated products is the tape composed of a regenerated cellulose backing and an adhesive coating that has a rubbery base. This last-mentioned tape is a product of the Minnesota Mining and Manufacturing Company and it is known as "Scotch Brand Cellophane Tape."

As a test for any loss of adhesiveness in adhesive materials left in contact with silicone elastomer-coated objects, the following procedure was developed. The adhesive surface of an adhesive and transparent tape, selected as a standard adhesive material, was placed in close contact with coated or uncoated Kraft paper and a 15 pound roller was passed over them. After five days, the adhesive and transparent tape was removed from the paper and fastened to a clean piece of plate glass by placing the adhesive side in contact with the glass and then passing a 15 pound roller over the outer side of the adhesive and transparent tape. The time required to strip the tape from the glass plate, using a stripping load of 384 grams per two inch width was taken as an index of the loss of adhesion of the adhesive and transparent tape, or the degree of migration of low molecular weight siloxanes into the adhesive and transparent tape. Less than two seconds are required to strip the adhesive and transparent tape from the glass plate under these conditions after it has been in contact for 5 days with paper that had been coated with a silicone elastomer obtained from a siloxane gum containing low molecular weight siloxanes. Adhesive and transparent tape is difficult to remove from paper which has not been coated, but once it is removed and tested as described above, about 22 seconds are required to remove the adhesive and transparent tape from the glass plate.

The following examples illustrate our invention.

*Example I*

A dimethylsiloxane gum was placed on a differential 2-roll mill and for each 100 parts of gum, 2 parts of finely divided silica, formed by the oxidation of silicon tetrachloride in a mixture of hydrogen and oxygen, were added and thoroughly milled in. The siloxane gum was sheeted off the roll mill onto an aluminum foil and placed in an oven at 150° C. for 3 hours to volatilize the low molecular weight siloxanes. The gum was then cooled, dissolved in a mixture of toluene and mineral spirits to prepare a 5 percent by weight solution. Then 10 parts by weight of benzoyl peroxide for each 100 parts by weight of treated siloxane gum were added to the solution and the solution was applied to paper by dipping the paper into the solution. After air drying to remove the solvent, the paper was heated at 150° C. for 10 minutes to cure the siloxane gum into a cross-linked, insoluble silicone elastomer. The paper was found to have increased 2 percent in weight, due to the loading of the silicone. The test described above was performed and approximately twelve seconds were required to remove the adhesive and transparent tape from the glass plate.

*Example II*

A 100 gram lot of dimethylsiloxane gum, prepared by polymerizing a mixture of hexamethylcyclotrisiloxane and octamethylcyclotetrasiloxane with 30 parts of potassium as a catalyst per million parts of the mixture by weight at 150° C., was milled with 1 gram of finely divided silica. A sample of the mixture so produced was heated at 150° C. to volatilize the low molecular weight siloxanes which were present in an equilibrium concentration. The following weight losses were noted during the heating at 150° C.:

| Time: | Total loss in weight of gum, percent |
|---|---|
| 4 hrs. | 11.2 |
| 7 hrs. | 11.4 |
| 24 hrs. | 11.5 |

After being heated for 24 hours at 150° C., the sample had become fairly hard but was easily reworked on the mill. After being reworked the sample was placed in an oven at 250° C. In 6 hours the sample suffered an additional 1.6% weight loss which rose to a 10.8% loss in 70 hours.

*Example III*

A 100 gram sample of the same dimethylsiloxane gum used in Example II was milled with 5 grams of finely divided silica, and then heated at 150° C. for 18 hours. Approximately 10 percent of the weight of the gum was volatilized as low molecular weight dimethylsiloxanes. A sample of the devolatilized gum was then heated at 250° C. The following weight changes were observed during the heating at 250° C.:

| Time: | Total loss in weight of gum, percent |
|---|---|
| 6 hrs. | 1.0 |
| 24 hrs. | 2.3 |

*Example IV*

One hundred grams of the same lot of dimethylsiloxane gum as was used in Example II were milled with 5 grams of finely divided silica and then heated to 150° C. to volatilize the low molecular weight siloxanes. The weight losses recorded during this 150° C. devolatization treatment were as follows:

| Time: | Total loss in weight of gum, percent |
|---|---|
| 4 hrs. | 10.7 |
| 7 hrs. | 10.8 |
| 24 hrs. | 10.9 |

After being heated for 24 hours at 150° C. the remaining sample, which had hardened somewhat, was reworked on the roll mill and then heated at 250° C. After 6 hours at 250° C. it had lost 1.3% by weight and, after a total of 70 hours of heating at 250° C., the total loss was 3.2% by weight.

*Example V*

A mixture of hexamethylcyclotrisiloxane and octamethylcyclotetrasiloxane was polymerized to form a high molecular weight dimethylsiloxane gum by heating the mixture at 150° C. for 3 hours with 30 parts of potassium as a catalyst per million parts of the mixture by weight. A 21.088 gram sample of this gum was heated in a forced-circulation oven at 250° C. and its weight change recorded as follows:

| Time: | Total loss in weight of gum |
|---|---|
| 1 hr. | 2.122 gm., 10%. |
| 2 hrs. | 4.028 gm., 19.2%. |
| 3 hrs. | 5.385 gm., 24.5%. |
| 5 hrs. | 7.487 gm., 35.5%. |
| 6 hrs. | 8.241 gm., 39.1%. |
| 10 hrs. | 10.651 gm., 50.5%. |
| 18 hrs. | 13.269 gm., 62.9%. |
| 26 hrs. | 14.795 gm., 70.1%. |
| 42 hrs. | 18.228 gm., 68.4%. |
| 49 hrs. | 18.727 gm., 88.8%. |
| 113 hrs. | 20.247 gm., 96.0%. |

The gum used in this example was produced by the same process as was used in producing the gum used in Example I.

What is claimed is:

1. An abhesive silicone-coated fibrous product comprising a fibrous base material coated with a silicone elastomer made from a stabilized, devolatilized, unfilled, curable dimethylsiloxane which is substantially free of low molecular weight dimethylsiloxanes.

2. An abhesive silicone-coated fibrous product comprising a fibrous base material coated with a silicone elastomer made from a stabilized, devolatilized, unfilled, curable dimethylsiloxane which is substantially free of low molecular weight dimethylsiloxanes having molecular weights below that corresponding to a viscosity of about 200,000 centipoises at normal room temperature.

3. An abhesive silicone-coated fibrous product comprising a fibrous base material coated with a silicone elastomer made from a stabilized, devolatilized, unfilled, curable dimethylsiloxane having a molecular weight range from that corresponding to a viscosity of about 200,000 centipoises at normal room temperature to that corresponding to a miniature pentrometer hardness of 30 at normal room temperature and which is substantially free of low molecular weight dimethylsiloxanes having molecular weights below that corresponding to a viscosity of about 200,000 centipoises at normal room temperature.

4. In the process of manufacturing abhesive fibrous materials by coating fibrous materials with a curable, unfilled dimethylsiloxane to render said fibrous materials abhesive, the improvement which comprises first stabilizing and devolatilizing the curable, unfilled dimethylsiloxane by forming a mixture of said dimethylsiloxane and finely divided silica and heating the mixture in the absence of a curing agent to a temperature sufficiently elevated to volatilize low molecular weight dimethylsiloxanes to produce a stabilized, devolatilized, curable, unfilled dimethylsiloxane substantially free of low molecular weight dimethylsiloxanes prior to coating said fibrous materials therewith and curing, whereby the abhesive coating produced on said fibrous materials substantially reduces any loss in adhesiveness in adhesive objects brought into contact therewith.

5. In the process of manufacturing abhesive fibrous materials by coating fibrous materials with a curable, unfilled dimethylsiloxane to render said fibrous materials abhesive, the improvement which comprises first stabilizing and devolatilizing the curable, unfilled dimethylsiloxane by forming a mixture of said dimethylsiloxane and finely divided silica, said finely divided silica being present in the mixture in an amount of about 0.5 part to about 5.0 parts by weight per 100 parts by weight of the dimethylsiloxane, and heating the mixture in the absence of a curing agent to a temperature sufficiently elevated to volatilize low molecular weight dimethylsiloxanes to produce a stabilized, devolatilized, curable, unfilled dimethylsiloxane substantially free of low molecular weight dimethylsiloxanes prior to coating said fibrous materials and curing, whereby the abhesive coating produced on said fibrous materials substantially reduces any loss in adhesiveness in adhesive objects brought into contact therewith.

6. In the process of manufacturing abhesive fibrous materials by coating fibrous materials with a curable, unfilled dimethylsiloxane to render said fibrous materials abhesive, the improvement which comprises first stabilizing and devolatilizing the curable, unfilled dimethylsiloxane by forming a mixture of said dimethylsiloxane and finely divided silica and heating the mixture in the absence of a curing agent to a temperature of about 150° C. to about 250° C. for about 1.0 hour to about 3.0 hours to volatilize low molecular weight dimethylsiloxanes to produce a stabilized, devolatilized, curable, unfilled dimethylsiloxane substantially free of low molecular weight dimethylsiloxanes prior to coating said fibrous materials and curing, whereby the abhesive coating produced on said fibrous materials substantially reduces any loss in adhesiveness in adhesive objects brought into contact therewith.

7. In the process of manufacturing abhesive fibrous materials by coating fibrous materials with a curable, unfilled dimethylsiloxane to render said fibrous materials abhesive, the improvement which comprises first stabilizing and devolatilizing the curable, unfilled dimethylsiloxane by forming a mixture of said dimethylsiloxane and finely divided silica, said silica being in the form of particles having an average particle diameter of about 10 to 30 millimicrons and having an average total surface area of about 100 to 300 square meters per gram, and heating the mixture in the absence of a curing agent to a temperature sufficiently elevated to volatilize low molecular weight dimethylsiloxanes to produce a stabilized, devolatilized, curable, unfilled dimethylsiloxane substantially free of low molecular weight dimethylsiloxanes prior to coating said fibrous materials and curing, whereby the abhesive coating produced on said fibrous materials substantially reduces any loss in adhesiveness in adhesive objects brought into contact therewith.

References Cited in the file of this patent
UNITED STATES PATENTS

| | | |
|---|---|---|
| 2,258,218 | Rochow | Oct. 7, 1941 |
| 2,457,688 | Krieble et al. | Dec. 28, 1948 |
| 2,467,976 | Hyde | Apr. 19, 1949 |
| 2,528,554 | Rust | Nov. 7, 1950 |
| 2,541,137 | Warrick | Feb. 13, 1951 |
| 2,561,362 | Guillot | July 24, 1951 |
| 2,646,373 | MacMullen et al. | July 21, 1953 |
| 2,793,198 | Bluestein | May 21, 1957 |
| 2,807,601 | Dennett | Sept. 29, 1957 |

UNITED STATES PATENT OFFICE
CERTIFICATE OF CORRECTION

Patent No. 2,940,875                          June 14, 1960

Frederick A. Smith et al.

It is hereby certified that error appears in the above numbered patent requiring correction and that the said Letters Patent should read as corrected below.

Column 2, lines 33 and 34, for "siloxone" read -- siloxane --; column 3, line 48, column 5, line 11, and column 6, lines 1, 15, and 42" for "adhesive", each occurrence, read -- abhesive --; column 6, line 59, for "adhasive" read -- adhesive --.

Signed and sealed this 12th day of September 1961.

(SEAL)
Attest:

ERNEST W. SWIDER                       DAVID L. LADD
Attesting Officer                         Commissioner of Patents

USCOMM-DC